(12) United States Patent
Thompson et al.

(10) Patent No.: US 7,722,454 B2
(45) Date of Patent: May 25, 2010

(54) REVENUE GENERATING SYSTEM AND ASSOCIATED METHODS

(76) Inventors: Kenneth R. Thompson, 250 W. 8th St., Chuluota, FL (US) 32766; Debra R. Hatch, 5949 Marville Cir., Port Orange, FL (US) 32127

( * ) Notice: Subject to any disclaimer, the term of this patent is extended or adjusted under 35 U.S.C. 154(b) by 1428 days.

(21) Appl. No.: 11/115,803

(22) Filed: Apr. 27, 2005

(65) Prior Publication Data
US 2006/0246967 A1    Nov. 2, 2006

(51) Int. Cl.
*A63F 9/24*    (2006.01)

(52) U.S. Cl. .............. 463/16; 463/1; 340/933; 340/928

(58) Field of Classification Search ......... 463/1, 463/16–17, 20, 25–42; 705/30, 14; 221/211; 340/933; 713/181; 380/251; 235/379
See application file for complete search history.

(56) References Cited

U.S. PATENT DOCUMENTS

| | | | |
|---|---|---|---|
| 5,101,200 A * | 3/1992 | Swett | 340/937 |
| 5,269,521 A | 12/1993 | Rossides | 273/138 |
| 5,422,473 A * | 6/1995 | Kamata | 235/384 |
| 5,933,096 A * | 8/1999 | Tsuda | 340/928 |
| 6,109,525 A * | 8/2000 | Blomqvist et al. | 235/384 |
| 6,140,941 A | 10/2000 | Dwyer et al. | 340/928 |
| 6,253,956 B1 | 7/2001 | Khan et al. | 221/211 |
| 6,263,316 B1 | 7/2001 | Khan et al. | 705/13 |
| 6,445,309 B1 * | 9/2002 | Walker et al. | 340/933 |
| 6,538,580 B2 * | 3/2003 | Bostrom et al. | 340/933 |
| 6,830,178 B2 * | 12/2004 | Jimenez | 235/379 |
| 2002/0023041 A1 | 2/2002 | Brett | 705/37 |
| 2003/0233278 A1 | 12/2003 | Marshall | 705/14 |
| 2004/0032083 A1 | 2/2004 | Walker et al. | 273/269 |
| 2005/0027623 A1 | 2/2005 | Otero | 705/30 |

* cited by examiner

*Primary Examiner*—Peter DungBa Vo
*Assistant Examiner*—Masud Ahmed
(74) *Attorney, Agent, or Firm*—Mark R. Malek, Esq; Zies Widerman & Malek (57) ABSTRACT

A system for generating revenue includes a fee collection station. The fee collection station may include a controller and a fee receiver in communication with the controller for receiving a predetermined fee from a plurality of users. The fee receiver may also receive a predetermined participation fee from the plurality of users that selectively participate in a game. The fee collection station may also comprise an indicator in communication with the controller and adjacent to the fee receiver for indicating to participating users one of a winning indication or a losing indication. The participating users that receive the winning indication may receive a predetermined reward.

22 Claims, 8 Drawing Sheets

REVENUE GENERATING SYSTEM AND ASSOCIATED METHODS

FIELD OF THE INVENTION

The present invention relates to the field of revenue generating and, more particularly, to the field of generating revenue at fee collection stations, and related methods.

BACKGROUND OF THE INVENTION

Toll collection stations are normally positioned along roadways to collect a fee for passage over such roadways. Traffic generally accumulates along toll roadways adjacent to toll collection stations, especially during rush hour conditions.

To remedy traffic accumulation, many tollroad agencies reconfigure toll collection stations to accept prepaid tolls. For example, U.S. Pat. No. 6,140,941 to Dwyer et al. discloses a cashless toll system that uses transponders to detect and track prepaid customers, and cameras to detect and track casual or non-transponder equipped customers. The system also includes a revenue management system that communicates with a bank/credit card clearing house to debit the cost of a toll from a prepaid user's account.

Prepaid toll systems may include dedicated toll lanes to allow prepaid users to pass through the toll collection stations without stopping to pay the toll. In other words, the toll may be automatically deducted from a prepaid user's account. This is accomplished by communications between an antenna at the toll collection station and a prepaid transponder positioned on the vehicle, as disclosed, for example, in the Dwyer et al. '941 patent.

Unfortunately, some vehicles are not equipped with prepaid transponders, and users of those vehicles may attempt to evade payment of the requisite toll by passing through lanes dedicated to prepaid toll users. Accordingly, some tollroad authorities have installed gates at the dedicated prepaid lanes that rise upon sensing the presence of a prepaid transponder. These gates, however, tend to slow the flow of traffic. Further, some users may choose to drive their vehicles through the gates, causing damage to both their vehicle and the gate.

There have been attempts to provide an incentive to users to pay the toll instead of evading the toll, besides the issuance of a traffic citation for not paying the toll. For example, U.S. Pat. No. 5,269,521 to Rossides discloses a system for betting between a buyer and a seller. The bets may be used to speed up movement of a line. The system discloses that a user may choose to bet at a tollbooth for a chance to pass through the tollbooth without paying. This system, however, may be disadvantageous because the payment required by a losing user may be quite high, i.e., several multiples of the actual price of the toll.

Other tollroad agencies have allowed for the sale of goods at tollbooths. For example, U.S. Pat. No. 6,263,316 to Khan et al. discloses a method for automated retailing of refreshments to a vehicle occupant as the vehicle passes through a toll station. U.S. Pat. No. 6,253,956, also to Khan et al., discloses that a tollbooth may be configured to provide for drive through purchasing and dispensing of other consumer goods.

SUMMARY OF THE INVENTION

In view of the foregoing background, it is therefore an object of the present invention to provide a system and method to increase revenue at fee collection stations.

It is also an object of the present invention to provide a system and method that provides incentives to users to pay a predetermined fee at a fee collection station.

It is further an object of the present invention to provide a system and method that rewards a selected number of users chosen from a plurality of users that participate in a game.

These and other objects, features and advantages in accordance with the present invention are provided by a system for generating revenue that includes a fee collection station. The fee collection station may comprise a controller and a fee receiver in communication with the controller for receiving a predetermined fee from a plurality of users.

The fee receiver may also receive a predetermined participation fee from the plurality of users that selectively participate in a game. The plurality of users that selectively participate in the game may be defined as participating users.

The fee collection station may also comprise an indicator in communication with the controller and adjacent to the fee receiver for indicating to the participating users at least one of a winning indication or a losing indication. The participating users that receive the winning indication may be defined as winning users. Each of the winning users may receive a predetermined reward. The fee collection station may, for example, be a tollbooth.

The system may also include a game processor in communication with the controller and the indicator. The game processor may be adjacent to the fee collection station, and may comprise an identification assignment device. The identification assignment device preferably assigns an identifier selected from a plurality of identifiers to each participating user.

The game processor may also comprise an identification selector in communication with the identification assignment device. The identification selector may select one of the plurality of identifiers to be defined as a winning identifier. The indicator may provide a winning indication responsive to selection of the winning identifier by the identification selector. The system may advantageously enhance the collection of revenue at fee collection stations, and also advantageously provides an incentive to users to pay predetermined fees at fee collection stations.

The system may also comprise a reward payment station adjacent to and spaced-apart from the fee collection station. The reward payment station may comprise a reward dispenser for dispensing the predetermined reward to each of the winning users.

The winning users may each be provided a winning code. Further, the reward dispenser may include a housing, a reward dispenser controller carried by the housing, and a user interface carried by the housing and in communication with the reward dispenser controller. The dispenser may also include a winning code database in communication with the reward dispenser controller and including a plurality of winning codes so that the predetermined reward may be dispensed to the winning user when the winning user inputs a winning code, and the winning code is verified as one of the plurality of winning codes in the winning code database. This embodiment advantageously allows a user to readily retrieve the predetermined reward.

Another embodiment of the reward payment station may include a reward payment administrator that dispenses the predetermined reward. This embodiment may advantageously enhance security at the reward payment station, and may also provide a simplified process for dispensing the predetermined reward.

The system may further comprise an antenna in communication with the controller for receiving a predetermined signal from a transponder carried by a vehicle. The transponder may be a prepaid transponder in communication with a respective payment account of one of the respective participating users. The predetermined fee and the predetermined participation fee may be debited from the respective payment account. Further, the respective predetermined reward may be credited to the respective payment account. This embodiment may advantageously increase the efficiency of the system by automatically crediting the user with the predetermined reward, and eliminate the necessity to travel to the reward payment station to receive the predetermined reward.

The system may also comprise an identification device for identifying each of the winning users. The identification device may be positioned adjacent to the fee collection station and in communication with the controller. The controller may be in communication with an identification database having an address for each of the winning users so that the predetermined reward may be mailed to each of the winning users. This embodiment of the present invention advantageously enhances the efficiency of the system by eliminating the need of the predetermined user to travel to the reward payment station to receive the reward.

A method aspect of the present invention is for generating revenue. The method may comprise collecting a predetermined participation fee at a fee collection station from a plurality of participating users to allow the plurality of participating users to selectively participate in a game. The method may also comprise indicating to the plurality of participating users at least one of a winning indication or a losing indication. The method may further comprise distributing a predetermined reward to each one of the winning users.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Referring initially to FIGS. 1-4, a system 15 for generating revenue according to the present invention will now be described. The system 15 illustratively includes a fee collection station 20. The fee collection station 20 is illustrated as a toll plaza, but may also be a single tollbooth, as understood by those skilled in the art. Those skilled in the art will also appreciate that the fee collection station 20 may be any type of station where any type of fee is collected, e.g., the Department of Motor Vehicles Office, the Tax Collector's Office, etc.

The fee collection station 20 preferably includes a controller 22 and a fee receiver 24 in communication therewith. The fee receiver 24 is preferably adapted to receive a predetermined fee from a plurality of users. In an embodiment of the invention where the fee collection station 20 is a tollbooth, the predetermined fee may, for example, be a toll at the tollbooth. Those skilled in the art, however, will appreciate that the predetermined fee may be any other type of fee that may be collected at any other type of fee collection station 20.

The fee receiver 24 is also preferably adapted to receive a predetermined participation fee from the plurality of users that selectively participate in a game. The plurality of users that selectively participate in a game are defined as participating users. The game may, for example, be a game of chance, such as a lottery type of game, as understood by those skilled in the art. Further, details of the game are provided below.

Figure 1:
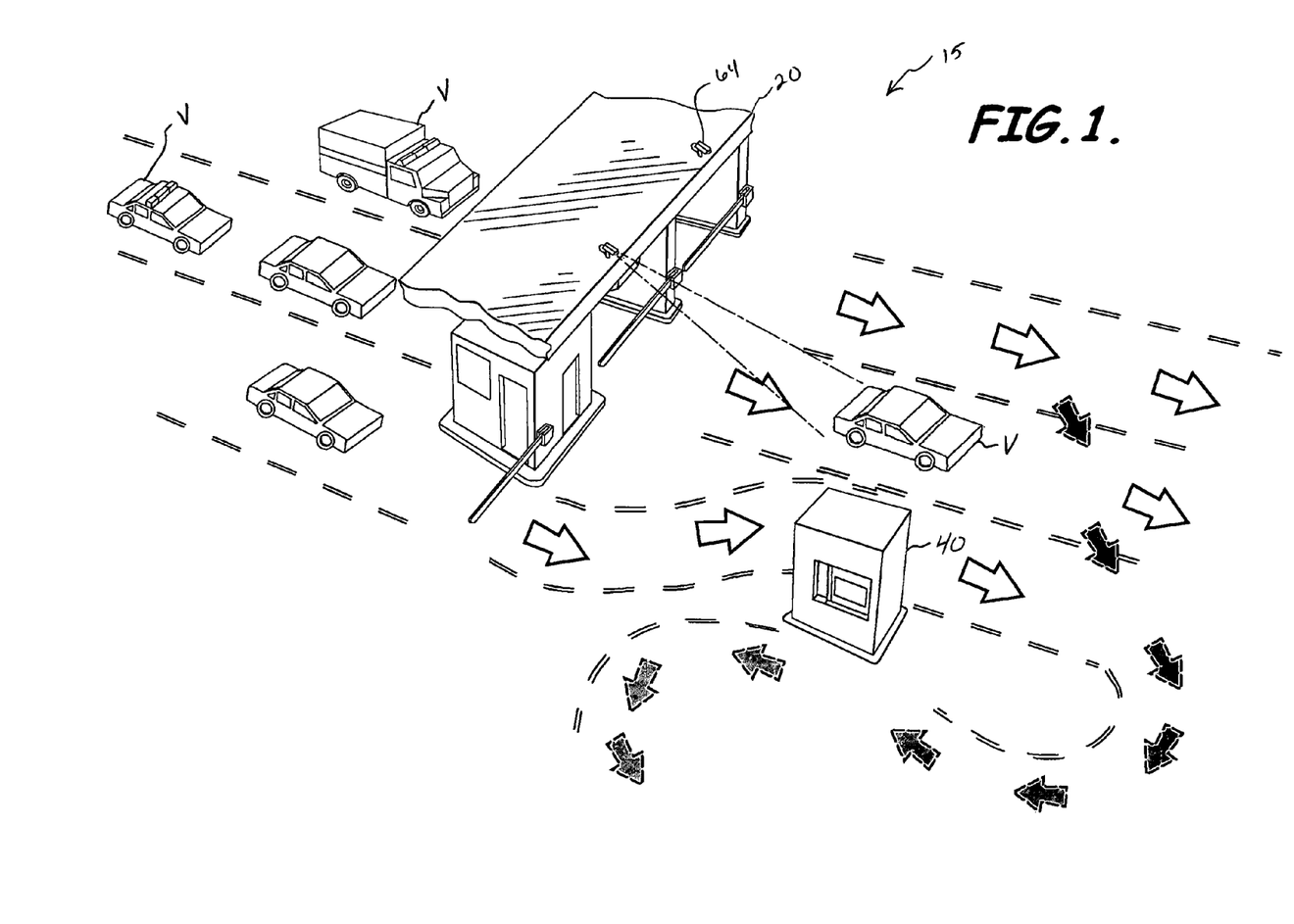
FIG. 1 is an environmental view of a system for generating revenue according to the present invention.

The fee collection station 20 also illustratively includes an indicator 26 in communication with the controller 22. The indicator 26 is preferably positioned adjacent the fee receiver 24, and indicates to the group of participating users at least one of a winning indication or a losing indication. The participating users that receive the winning indication are defined as winning users. Each of the winning users receive a predetermined reward. As perhaps best illustrated in FIG. 2, the indicator 26 may be positioned in a location to be readily visible by the participating user after the predetermined participation fee has been paid by the participating user. Those skilled in the art will appreciate that the indicator 26 may be provided by any type of display, such as the display illustrated in FIG. 2, a scrolling display, or any other type of display that would accomplish the goal of providing a participating user with one of a winning or losing indication.

Figures 2, 3:
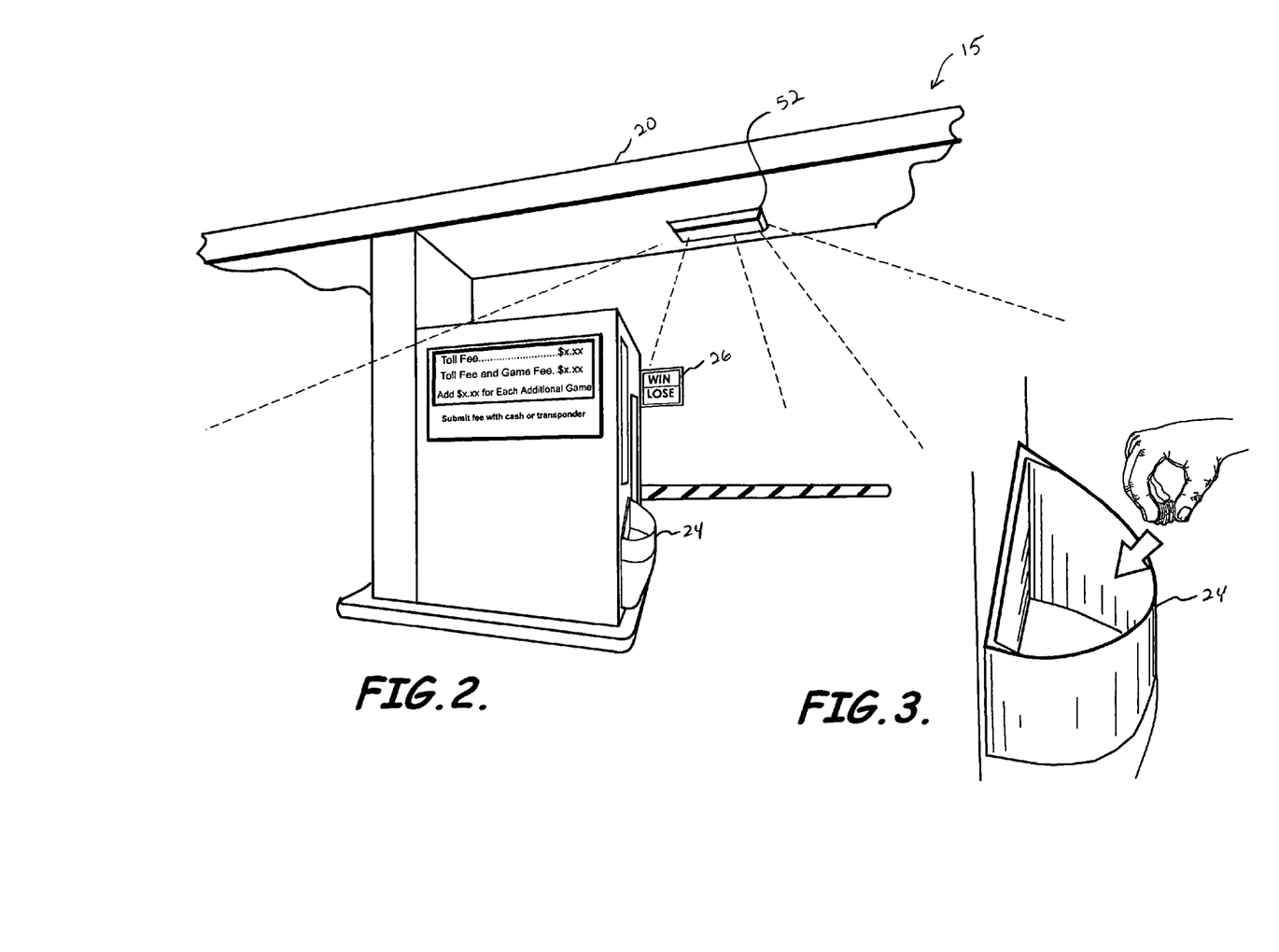
FIG. 2 is a partial perspective view of a fee collection station of the system illustrated in FIG. 1.
FIG. 3 is a partial environmental view of a fee receiver of the fee collection station illustrated in FIG. 2.

Although FIG. 3 illustrates that the predetermined fee and the predetermined participation fee may be paid by depositing coins into a fee receiver 24 at a fee collection station 20, those skilled in the art will appreciate that the predetermined fee and the predetermined participation fee may be paid to an attendant at a fee collection station. As will be discussed in greater detail below, the predetermined fee and predetermined participation fee may also be paid in a number of different ways.

Figure 4:
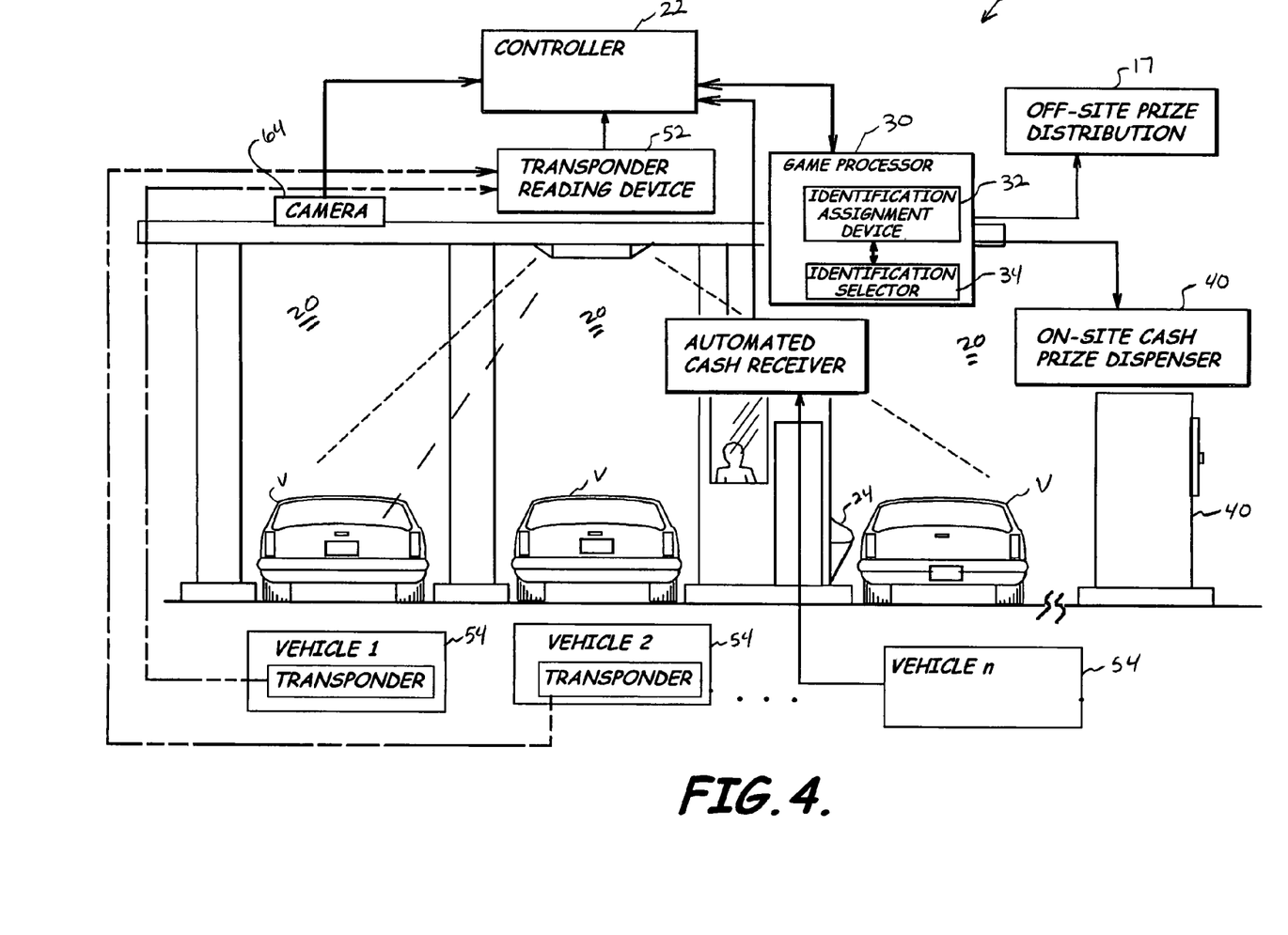
FIG. 4 is a schematic view of the system according to the present invention and illustrating a controller in communication with an antenna, a vehicle transponder, a prepaid user account, and an identification device.

Referring now more specifically to FIG. 4, the system 15 according to the present invention is now described in greater detail. The system 15 illustratively comprises a game processor 30 in communication with the controller 22 and adjacent to the fee collection station 20. The game processor 30 may comprise an identification assignment device 32 for assigning an identifier to each of the participating users. The identifier is preferably selected from a plurality of identifiers. Further, each of the identifiers is preferably a unique identifier.

Accordingly, no two participating users may be assigned identical identifiers. This advantageously increases the accuracy in determining which of the participating users is a winning user.

The game processor 30 may also comprise an identification selector 34 in communication with the identification assignment device 32. The identification selector 34 preferably selects one of the plurality of identifiers to be defined as a winning identifier. Of course, the indicator 26 and the game processor 30 are preferably in communication with one another. Accordingly, the indicator 26 may provide the winning indication responsive to selection of the winning identifier by the identification selector 34. More specifically, the winning indication is provided by the indicator 26 when the identifier assigned to the participating user is identified as a winning identifier. The winning identifier may, for example, be selected randomly, or be any other process, as understood by those skilled in the art. This process advantageously enhances the accuracy of the system 15.

Figure 5:
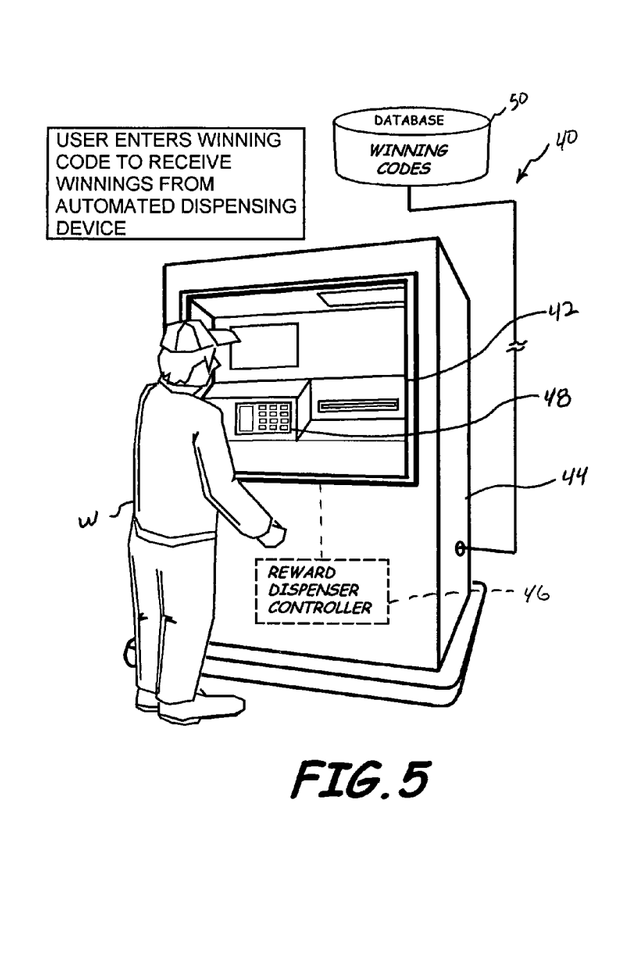
FIG. 5 is a schematic view of a reward payment station of the system according to the present invention.
Figure 6:
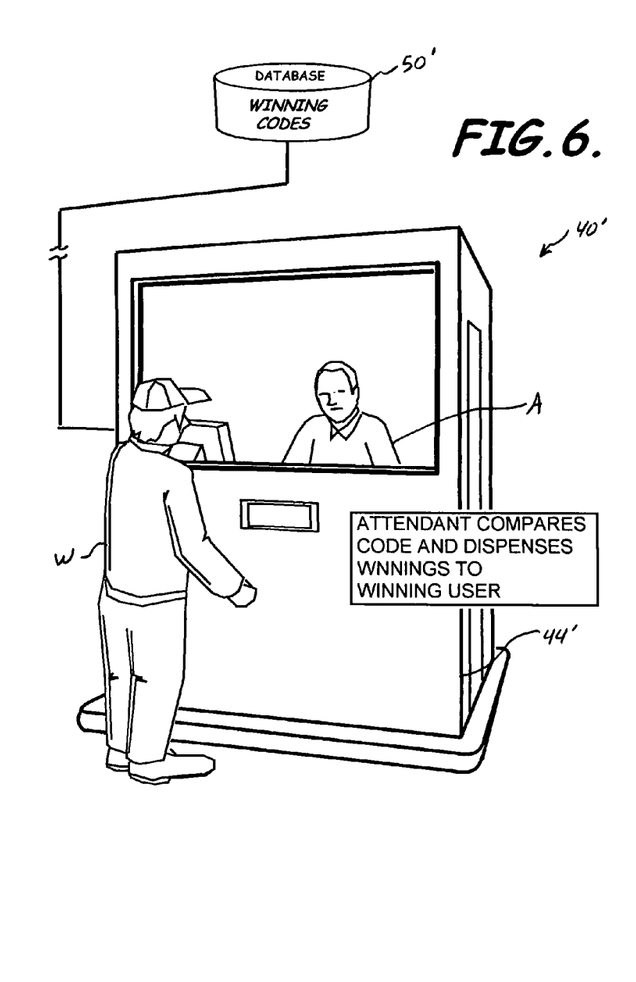
FIG. 6 is a schematic view of another embodiment of a reward payment station of the system according to the present invention.

As illustrated in FIG. 4, the predetermined reward, or prize, may be distributed off-site 17, or at an on-site cash prize dispenser, i.e., a reward payment station 40. Referring now additionally to FIGS. 5 and 6, a reward payment aspect of the system 15 according to the present invention is now described in greater detail. More particularly, the system 15 comprises a reward payment station 40 adjacent to and spaced-apart from the fee collection station 20. The reward payment station 40 advantageously allows a winning user to rapidly receive payment of the predetermined reward from winning the game.

A first embodiment of the reward payment station 40 is illustrated in FIG. 5. More specifically, the reward payment station 40 may comprise a dispenser 42 for dispensing the predetermined reward to each one of the winning users W. In this embodiment of the reward payment station 40 the reward dispenser 42 includes a housing 44, a reward dispenser controller 46 carried by the housing, a user interface 48 carried by the housing and in communication with the reward dispenser controller, and a winning code database 50 in communication with the reward dispenser controller.

Each winning user W is preferably provided a winning code when the indicator 26 provides a winning indication. More specifically, the winning code may be displayed to the winning user W on the display, may be provided to the winning user in the form of a receipt dispensed at a fee collection station 20 similar to that illustrated in FIGS. 2-3, or may be provided to a winning user by an attendant at the fee collection station. Those skilled in the art will appreciate that the winning code may be provided to the winning user W by any other process as well.

The winning code database 50 preferably includes a plurality of winning codes. Accordingly, the predetermined reward is dispensed to the winning user W at the reward dispenser 42 when the winning user inputs a winning code via the user interface 48, and the winning code is verified as one of the plurality of winning codes in the winning code database 50. A reward payment station 40 having a reward dispenser 42 with a user interface 48 advantageously prevents fraudulent requests by users to receive rewards.

Referring now more specifically to FIG. 6, another embodiment of the reward payment station 40' is now described in greater detail. In this embodiment, the reward payment station 40' includes a reward payment administrator A' to dispense the predetermined reward. The winning user W' provides the reward payment administrator A' with the winning code that the winning user received from the indicator 26 adjacent the fee collection station 20.

The reward payment administrator A' may verify the validity of the winning code provided by the winning user W' by accessing the winning code database 50'. After the winning code in verified by the reward payment administrator A', the reward payment administrator may provide the predetermined reward to the winning user W'. This embodiment of the reward payment station 40' advantageously enhances security at the reward payment station and also advantageously enhances the accuracy of the system 15'.

Those skilled in the art will appreciate that the administrator A' may also verify that the user is a winning user W using visual verification. In other words, the administrator A' may review a photograph of the winning user's W license plate, and compare information associated with the winning user's license plate with identification of the winning user, i.e., the winning user's driver's license. The other elements of this embodiment of the reward payment station 40' are similar to those of the first embodiment of the reward payment station 40, are labeled with prime notation, and require no further discussion herein.

Figure 7:
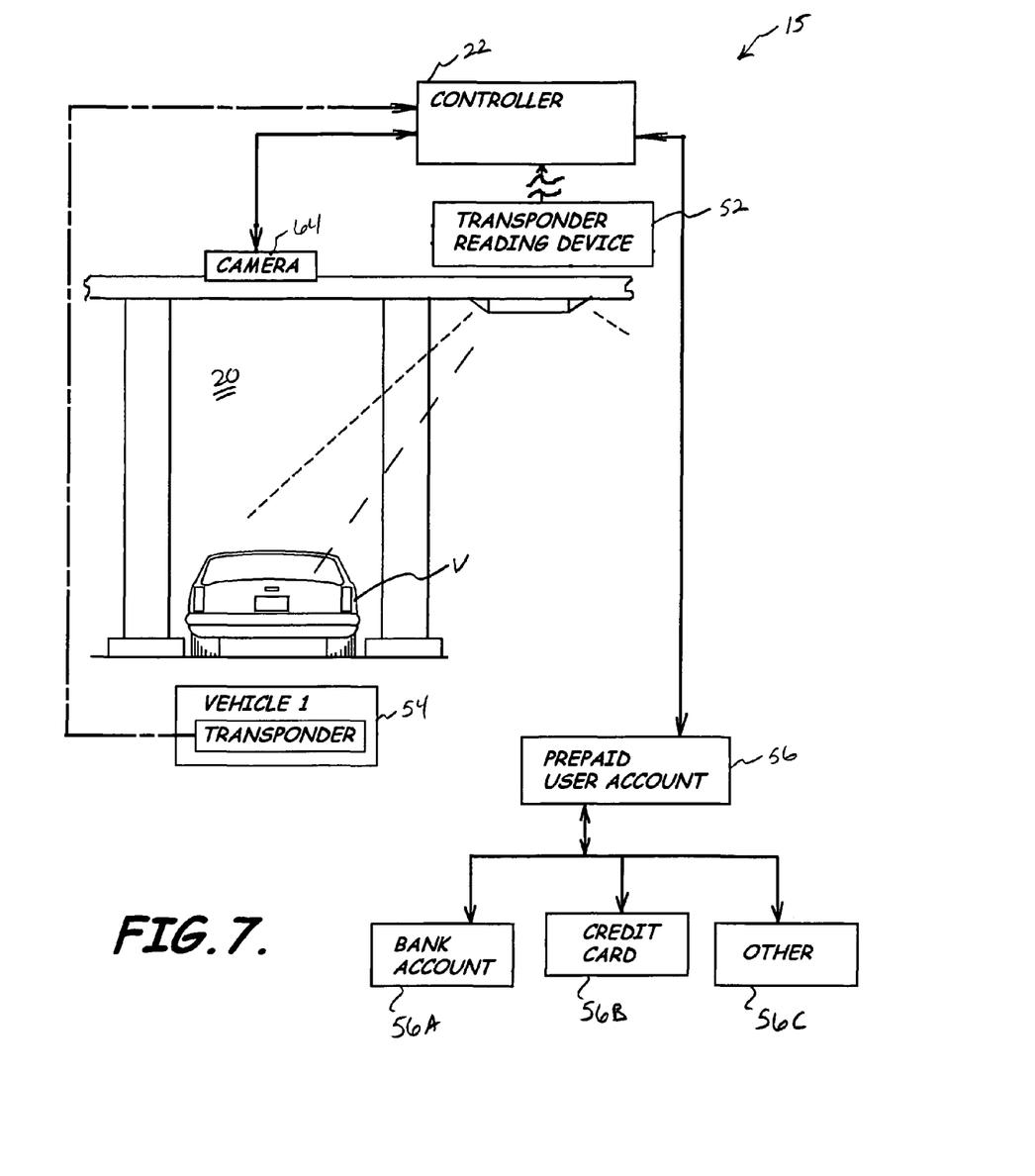
FIG. 7 is a schematic view of the system according to the present invention and illustrating communication between a controller and a prepaid user account.
Figures 8, 9:
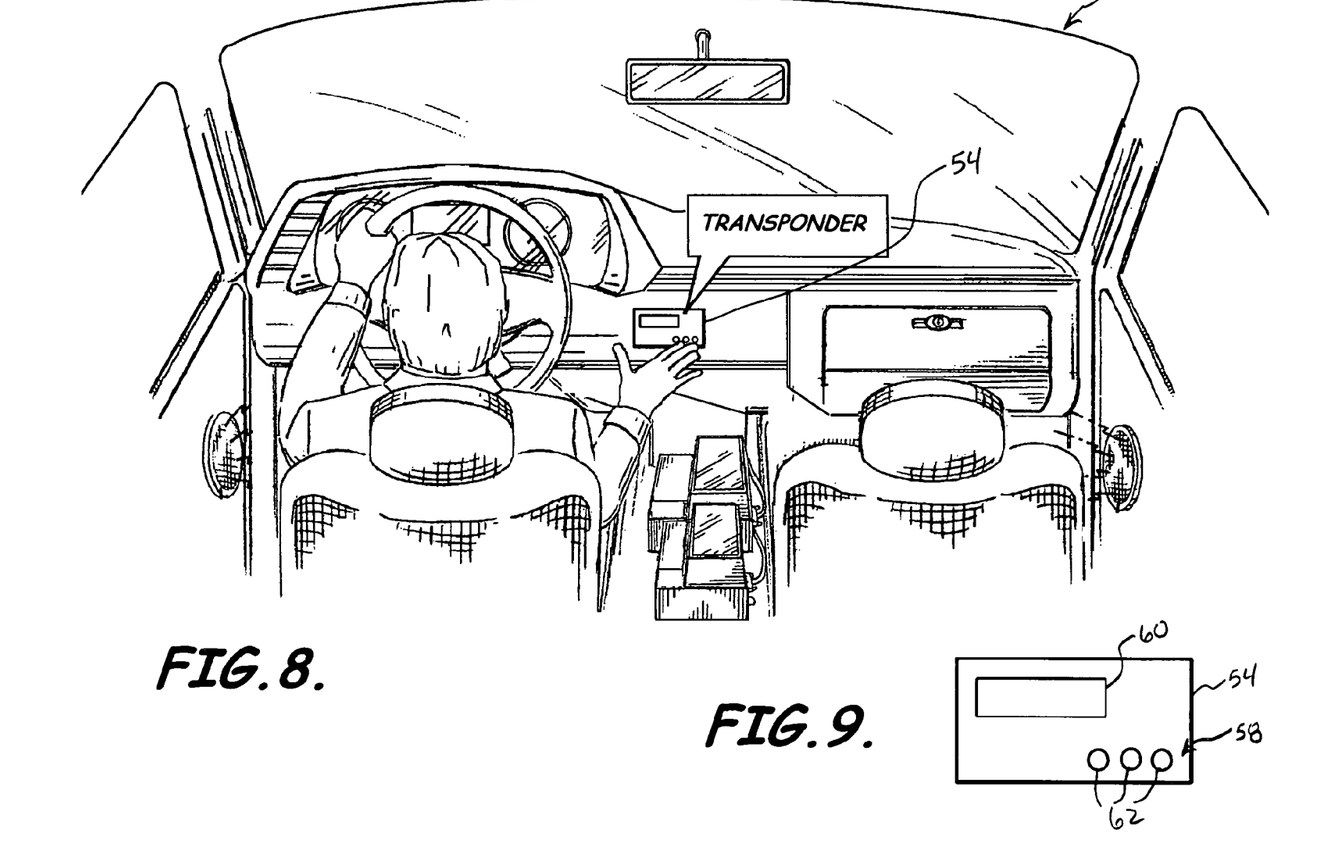
FIG. 8 is a partial environmental view of a user engaging a transponder carried by a vehicle to send a signal to an antenna according to the present invention.
FIG. 9 is a front elevation view of the transponder illustrated in FIG. 8.

Referring now additionally to FIGS. 7-9, other aspects of the system 15 are now described in greater detail. The system 15 according to the present invention may include an antenna 52 in communication with the controller 22 for receiving a predetermined signal from a transponder 54 carried by a vehicle V. The transponder 54 is preferably a prepaid transponder in communication with a respective payment account 56 of the respective participating user. The payment account 56 is preferably a prepaid user account. In other words, the payment account 56 is a source of funding linked to the participating user in possession of the transponder 54. The source of funding may, for example, be a bank account 56A, a credit card 56B, or any other form of funding 56C that may be available to the user to fund the prepaid payment account 56, as understood by those skilled in the art.

As a vehicle V equipped with a transponder 54 passes through the fee collection station 20, the antenna 52, e.g., transponder reading device, reads a signal transmitted by the transponder. The signal preferably authorizes payment of the predetermined participation fee from the user's payment account 56.

As perhaps best illustrated in FIG. 8, a participating user may selectively participate in the game by engaging a button 62, for example, on the transponder 54 indicating a desire to participate in the game and pay the predetermined participation fee. When the participating user indicates a desire to pay the predetermined participation fee to participate in the game, a signal is transmitted from the transponder 54 to the antenna 52 authorizing the amount of the predetermined participation fee to be debited from the user's payment account 56. If the participating user receives a winning indication, i.e., is a winning user W, the respective predetermined reward is credited to the winning user's payment account 56.

As illustrated in FIG. 9, the transponder 54 preferably includes a user interface 58 and a display 60. The user interface 58 illustratively includes a plurality of buttons 62. Each of the buttons 62 may allow a participating user to participate in various multiples of the game. For example, a user may press a first one of the buttons 62 to participate in the game once, and another one of the buttons to participate multiple times.

In other words, a participating user may pay two predetermined participation fees for a chance to win double the predetermined reward, or pay three predetermined participation fees for a chance to win triple the predetermined reward. Accordingly, a participating user may participate in the game in any number of ways, i.e., the participating user may play the game multiple times, or may pay an additional amount as a multiplier to possibly multiply the predetermined reward.

Those skilled in the art will appreciate that a user may monitor the frequency with which they participate in the game. This may be monitored using an Internet site on a global communications network, for example. Further, a participating user may pre-pay the participation fee, or multiples thereof, on the Internet site.

The display 60 on the transponder 54 may advantageously provide an indication prompting a user to participate in the game. This type of prompt is preferably displayed on the display 60 prior to reaching the fee collection station 20 so that the user may have sufficient time to decide whether or not to participate in the game. After the user has selected to participate in the game, the display 60 may also show a prompt requesting how many multiples of the game the user wishes to participate in.

After passing the fee collection station 20 it is determined whether the participating user is a winning user W. If the participating user is a winning user W, a winning indication may be displayed on the display 60. Similarly, if the participating user is not a winning user W, a losing indication may be displayed on the display 60. Accordingly, in the instance where one of the winning or losing indications are provided on the display 60 of the transponder 54, the display also acts as the indicator 26 of the system 15.

A vehicle V equipped with a transponder 54 and using the system 15 of the present invention advantageously allows a user to pay the predetermined participation fee without the need to stop at a fee collection station 20. Further, such a vehicle V advantageously allows a participating user to pay the predetermined participation fee without stopping at the fee collection station 20, and receive the predetermined reward without traveling to the reward payment station 40. Although use of a transponder is disclosed, those skilled in the art will appreciate that this aspect of the present invention may also be accomplished using any type of signal transmitting device, such as a cellular telephone, for example.

Figure 10:
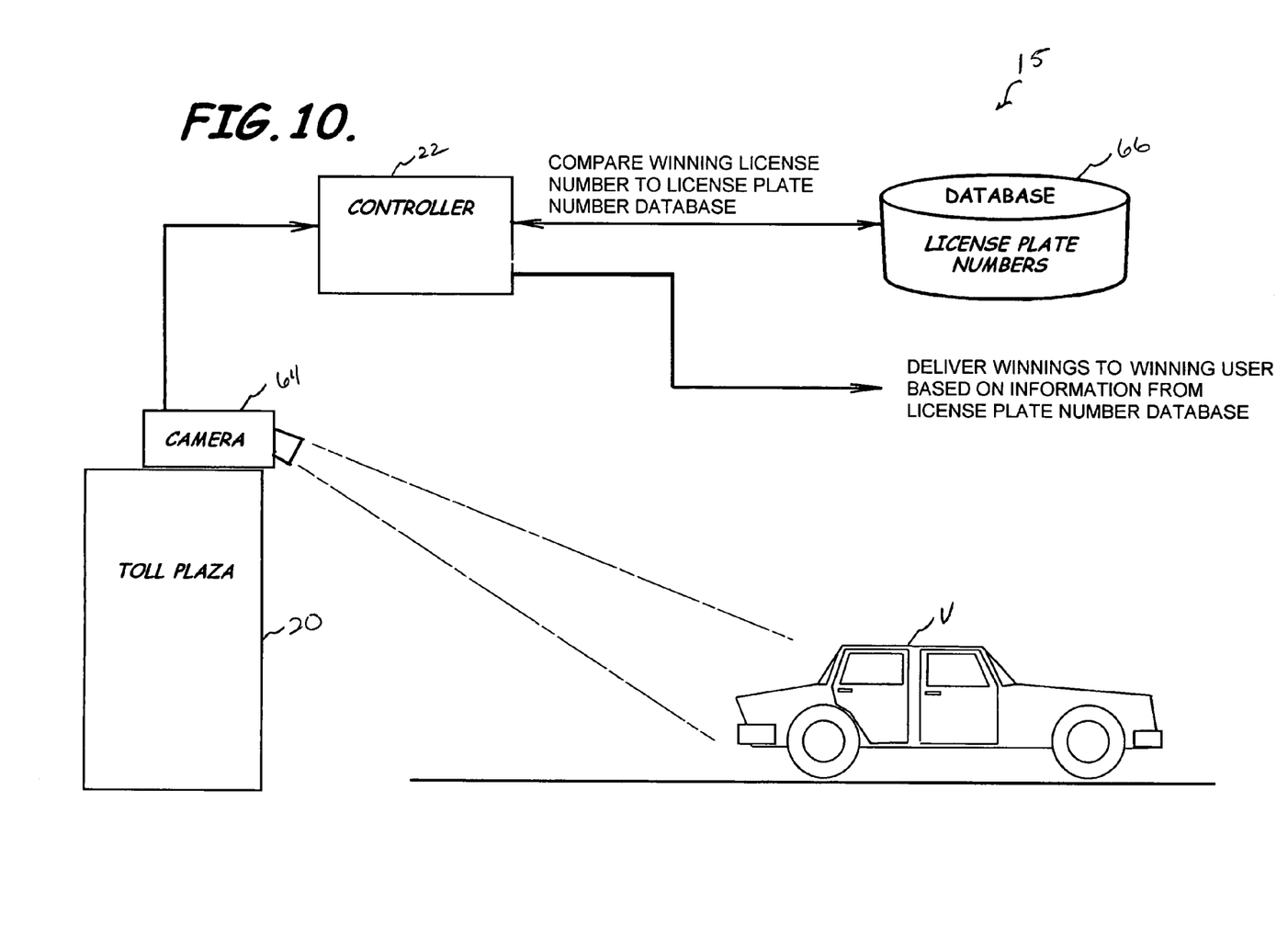
FIG. 10 is a schematic view of the system according to the present invention and illustrating an identification device adjacent the fee collection station.

Referring now additionally to FIG. 10, another aspect of the system 15 according to the present invention is now described in greater detail. The system 15 may include an identification device 64 adjacent the fee collection station 20. The identification device 64 may, for example, illustratively be provided by the camera. Those skilled in the art, however, will appreciate that any other type of identification device 64 may also be used to accomplish this aspect of the present invention. The identification device 64 is in communication with the controller 22 and preferably identifies each of the winning users W.

The controller 22 is illustratively in communication with an identification database 66. The identification database 66 includes addresses for each of the winning users W so that the predetermined reward may be mailed to each of the winning users. Those skilled in the art will appreciate that this aspect of the system 15 of the present invention contemplates that a notification may be mailed to the winning user W based on information retrieved from the identification database 66 and that the winning user may be required to claim the predetermined reward, for example.

The identification device 64 preferably captures an image of a license plate on a vehicle V as it passes through the fee collection station 20, e.g., a toll plaza. The identification database 66 preferably comprises addresses associated with the vehicle license plates. When a winning user W is identified, the identification device 64 may send an image of the license plate to the identification database 66 to match the image of the license plate with an address of the winning user W. Thereafter, the predetermined reward may be delivered to the winning user W based on the information retrieved from the identification database 66.

This aspect of the system 15 advantageously eliminates the need for a winning user W to go to the reward payment station 40 to receive the predetermined reward. Accordingly, the process of receiving the predetermined reward, if the participating user is a winning user W, is greatly enhanced.

Figure 11:
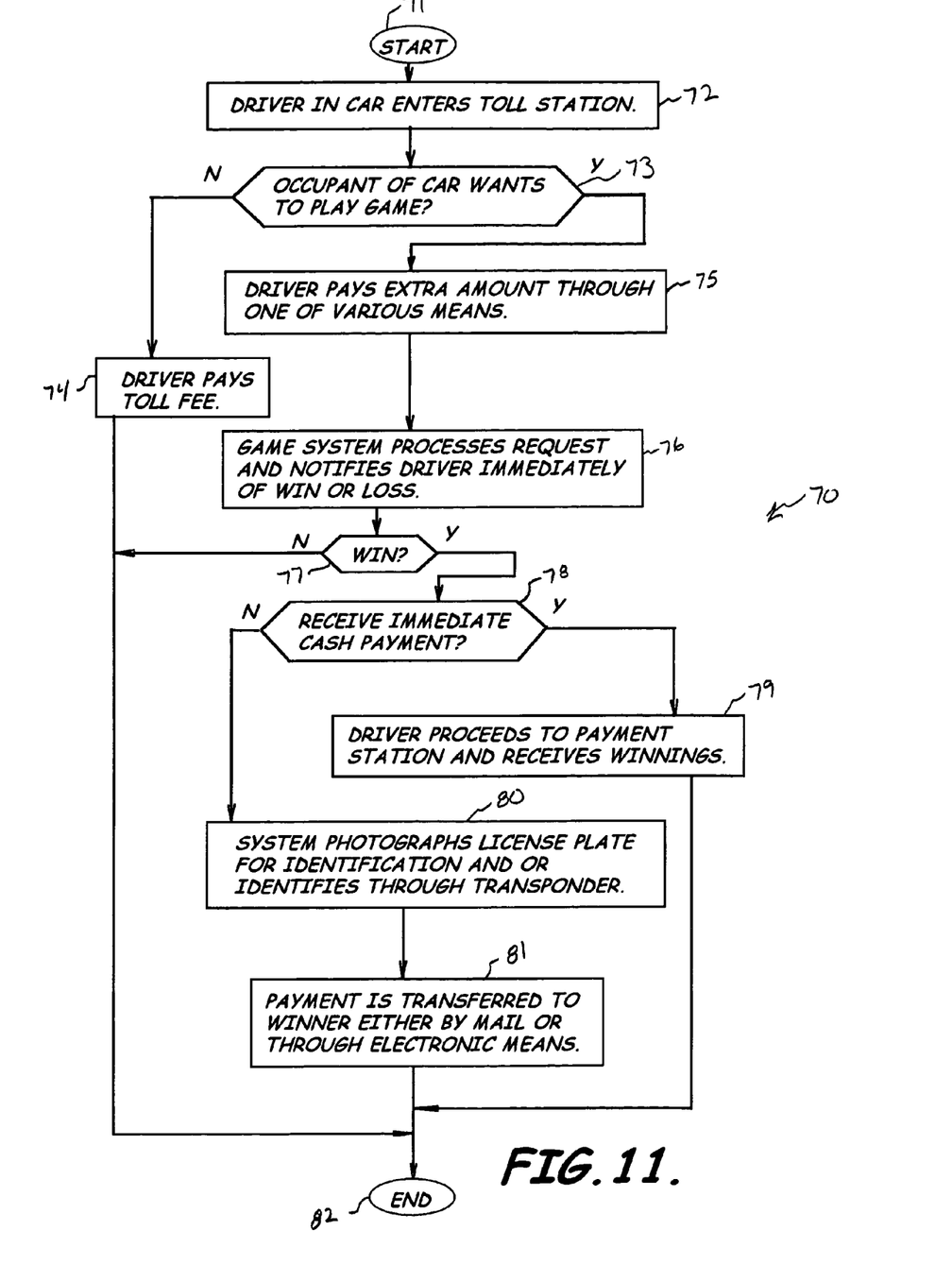
FIG. 11 is a flow chart illustrating a method aspect of the present invention.

Referring now to the flow chart 70 of FIG. 11, a method aspect of the present invention is now described in greater detail. From the start (Block 71), a driver enters a toll station at Block 72. At Block 73 it is determined whether the driver wants to play the game. If the driver does not want to play the game, then the driver pays the normal toll fee at Block 74, and the method is ended at Block 82.

If, however, the driver selects to participate in the game, then the driver pays the predetermined participation fee at Block 75. At Block 76, the game processor 30 processes the users request to participate in the game, and notifies the driver immediately whether or not they have won the game at Block 77. If the driver did not win the game, then the process is ended at Block 82.

If, however, the driver is provided a winning indication, then at Block 78, it is determined whether or not immediate payment of the reward is to be dispensed to the winning user W. If the winning user W desires immediate payment of the predetermined reward, then the driver may proceed to the reward payment station 40 at Block 79 to receive the predetermined reward. After the driver has received the predetermined reward, the method is ended at Block 82.

If, however, the driver desires to receive the predetermined reward at a later time, i.e., the driver does not wish to proceed to the reward payment station 40, the system 15 may photograph the license plate of the vehicle V for identification at Block 80. Payment of the predetermined reward is transmitted to the winner by mail at Block 81 if the camera 64 is used to identify the winning user W by capturing an image of the license plate, as described above.

Alternately, at Block 80 a winning user W may be identified through a transponder 54 if the vehicle V is so equipped. For vehicles V that are equipped with transponders 54, payment may be electronically transferred to a payment account 56 of the winning user W at Block 81. Thereafter, the method is ended at Block 82.

Although the method aspect of the present invention described above makes references to the fee collection station 20 being a tollbooth, and the participating user being the driver of a vehicle V passing through the tollbooth, those skilled in the art will appreciate that the fee collection station may be any type of station where a fee is to be paid, and the user may be any type of user associated with such a fee collection station.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system for generating revenue comprising:
   at least one tollbooth;
   a controller adjacent to said at least one tollbooth;
   a game processor in communication with said controller comprising:

an identification assignment device for assigning at least one identifier, selected from a plurality of identifiers, to each of a plurality of users that selectively indicate a desire to participate in a game, the plurality of users selectively indicating a desire to participate in the game being defined as participating users; and an identification selector in communication with said identification assignment device for selecting at least one of the assigned identifiers, each selected identifier being defined as a winning identifier, the remaining unselected identifiers being defined as losing identifiers, the participating users associated with the winning identifiers being defined as a winning users, and the participating users associated with the losing identifiers being defined as losing users; and at least one reward-dispensing member in communication with said controller for dispensing a predetermined reward to each of the winning users;

wherein each of the at least one tollbooth comprises:

a fee receiver in communication with said controller for receiving a predetermined toll from every user that passes through the tollbooth, and for receiving a predetermined game participation fee from each of the participating users; and an indicator in communication with said controller and adjacent to said fee receiver for indicating to the participating users at least one of a winning indication and a losing indication, wherein winning users are provided with the winning indication and losing users are provided with the losing indication.

2. A system according to claim 1 wherein the participating users selectively indicate their desire to participate in the game by providing to the fee receiver both of the predetermined toll and the predetermined game participation fee.

3. A system according to claim 1 wherein the at least one reward-dispensing member is at least one reward payment station adjacent to and spaced-apart from said at least one tollbooth.

4. A system according to claim 3 wherein said at least one reward payment station comprises an automated reward dispenser for dispensing the predetermined reward to each one of the winning users.

5. A system according to claim 4 wherein each winning user is provided a winning code; and wherein said automated reward dispenser includes a housing, a reward dispenser controller carried by said housing, a user interface carried by said housing and in communication with the reward dispenser controller, and a winning code database in communication with the reward dispenser controller and including a plurality of winning codes so that the predetermined reward is dispensed to the winning user when the winning user inputs the winning code, and the winning code is verified as one of the plurality of winning codes in the winning code database.

6. A system according to claim 3 wherein said at least one reward payment station comprises a reward payment administrator to dispense the predetermined reward.

7. A system according to claim 1 further comprising at least one antenna in communication with said controller for receiving a predetermined signal from a transponder carried by a vehicle, wherein the transponder comprises at least one game participation button and the participating users indicate their desire to participate in the game by engaging the game participation button.

8. A system according to claim 7 wherein the transponder is a prepaid transponder in communication with a respective payment account of one of the respective participating users; and wherein the predetermined toll and the predetermined game participation fee are debited from the respective payment account; and wherein the at least one reward-dispensing member credits the respective predetermined reward to the respective payment account.

9. A system according to claim 1 further comprising an identification device adjacent said at least one tollbooth and in communication with said at least one reward-dispensing member for identifying each of the winning users, said at least one reward-dispensing member being in communication with an identification database having an address for each of the winning users so that the predetermined reward may be mailed to each of the winning users.

10. A system for generating revenue comprising:

at least one tollbooth comprising a controller, a fee receiver in communication with the controller for receiving a predetermined toll from a plurality of users and a predetermined game participation fee from a plurality of participating users that selectively indicate their desire to participate in a game, and an indicator in communication with the controller and adjacent to the fee receiver for indicating to the participating users at least one of a winning indication a losing indication, the participating users receiving the winning indication being defined as winning users;

a game processor in communication with the indicator and the controller and adjacent to said at least one tollbooth; and at least one reward payment station adjacent to and spaced-apart from said at least one tollbooth for dispensing a predetermined reward to each of the winning user;

wherein said game processor comprises an identification assignment device for assigning at least one identifier selected from a plurality of identifiers to each participating user.

11. A system according to claim 1 wherein said game processor further comprises an identification selector in communication with said identification assignment device for selecting at least one of the assigned identifiers, each of the selected identifiers being defined as a winning identifier, said indicator providing the winning indication responsive to selection of the winning identifier by said identification selector.

12. A system according to claim 10 wherein said at least one reward payment station comprises an automated reward dispenser for dispensing the predetermined reward to each one of the winning users.

13. A system according to claim 12 wherein each winning user is provided a winning code; and wherein said automated reward dispenser includes a housing, a reward dispenser controller carried by said housing, a user interface carried by said housing and in communication with the reward dispenser controller, and a winning code database in communication with the reward dispenser controller and including a plurality of winning codes so that the predetermined reward is dispensed to the winning user when the winning user inputs the winning code, and the winning code is verified as one of the plurality of winning codes in the winning code database.

14. A system according to claim 10 wherein said at least one reward payment station comprises a reward payment administrator to dispense the predetermined reward.

15. A system for generating revenue comprising:

at least one tollbooth, a controller adjacent to the at least one tollbooth, a fee receiver in communication with the controller for receiving a predetermined toll from every user and a predetermined game participation fee from a plurality of participating users that selectively indicate a desire to participate in a game, and an indicator in communication with the controller and adjacent to the fee receiver for indicating to the participating users at least one of a winning indication and a losing indication, the participating users receiving the winning indication being defined as winning users;

a game processor in communication with the controller and adjacent to the at least one tollbooth;

at least one reward-dispensing member in communication with the controller for dispensing a predetermined reward to each of the winning users; and at least one antenna in communication with the controller for receiving a predetermined signal from a transponder carried by a vehicle, wherein the transponder comprises at least one game participation button and the participating users indicate a desire to participate in the game by engaging the game participation button;

wherein said game processor comprises an identification assignment device for assigning at least one identifier selected from a plurality of identifiers to each participating user.

16. A system according to claim 15 wherein said game processor further comprises an identification selector in communication with said identification assignment device for selecting at least one of the assigned identifiers, each of the selected identifiers being defined as a winning identifier, the indicator providing the winning indication responsive to selection of the winning identifier by said identification selector.

17. A system according to claim 15 wherein the transponder is a prepaid transponder in communication with a respective payment account of one of the respective participating users; and wherein the predetermined toll and the predetermined game participation fee are debited from the respective payment account; and wherein the at least one reward-dispensing member credits the respective predetermined reward to the respective payment account.

18. A method for generating revenue using a revenue generating system comprising at least one tollbooth, a controller adjacent to the at least one tollbooth, a game processor in communication with the controller, and at least one reward-dispensing member in communication with the controller, each of the at least one tollbooth comprising a fee receiver in communication with the controller and an indicator in communication with the controller and adjacent to the fee receiver, the game processor comprising an identification assignment device and an identification selector in communication with the identification assignment device, the method comprising the machine-implemented steps of:

collecting a predetermined toll from every user and a predetermined game participation fee from a plurality of participating users to allow the plurality of participating users to selectively participate in a game;

assigning at least one identifier, selected from a plurality of identifiers, to each participating user;

selecting at least one of the assigned identifiers, each of the selected identifiers being defined as a winning identifier, the remaining unselected identifiers being defined as losing identifiers, the participating users associated with the winning identifiers being defined as winning users, and the participating users associated with the losing identifiers being defined as losing users;

indicating to the participating users at least one of a winning indication and a losing indication, wherein winning users are provided with the winning indication and losing users are provided with the losing indication; and distributing a predetermined reward to each of the winning users.

19. A method according to claim 18 wherein the at least one reward-dispensing member is at least one reward payment station adjacent to and spaced-apart from the at least one tollbooth.

20. A method according to claim 19 further comprising providing a winning code to each one of the winning users; and wherein the reward payment station comprises a reward dispenser including a user interface, and a winning code database including a plurality of winning codes in communication therewith so that the predetermined reward is dispensed to the winning user when the winning user inputs the winning code, and the winning code is verified as one of the plurality of winning codes in the winning code database.

21. A method according to claim 19 wherein the reward payment station comprises a reward payment administrator that dispenses the predetermined reward.

22. A method according to claim 18 wherein the revenue generating system further comprises an identification device adjacent to the at least one tollbooth, the method further comprising the machine-implemented steps of identifying each of the winning users, and communicating with an identification database having an address for each of the winning users so that the predetermined reward may be mailed to each of the winning users.

* * * * *